(12) United States Patent
New

(10) Patent No.: US 6,183,138 B1
(45) Date of Patent: Feb. 6, 2001

(54) TILTING PAD THRUST BEARING ARRANGEMENT

(75) Inventor: Nigel H New, Harrow (GB)

(73) Assignee: Federal-Mogul Engineering Limited, Manchester (GB)

(*) Notice: Under 35 U.S.C. 154(b), the term of this patent shall be extended for 0 days.

(21) Appl. No.: 09/403,795

(22) PCT Filed: Apr. 2, 1998

(86) PCT No.: PCT/GB98/00983

§ 371 Date: Oct. 27, 1999

§ 102(e) Date: Oct. 27, 1999

(87) PCT Pub. No.: WO98/50708

PCT Pub. Date: Nov. 12, 1998

(30) Foreign Application Priority Data

May 7, 1997 (GB) .................................... 9709164

(51) Int. Cl.$^7$ .................................................. F16C 17/04
(52) U.S. Cl. ........................................................ 384/308
(58) Field of Search ................................. 384/122, 303, 384/306, 308, 309, 312

(56) References Cited

U.S. PATENT DOCUMENTS

| | | | |
|---|---|---|---|
| 1,701,078 | * 2/1929 | Layne | 384/308 |
| 2,778,696 | 1/1957 | Lease | 384/308 |
| 3,142,519 | * 7/1964 | Abramovitz | 384/308 |
| 3,937,534 | 2/1976 | Welch | 384/420 |

FOREIGN PATENT DOCUMENTS

| | | |
|---|---|---|
| 212 489 | 3/1941 | (CH) . |
| 34 14 092 | 1/1985 | (DE) . |
| 525 649 | 9/1921 | (FR) . |
| 1241098 | 7/1971 | (GB) . |
| 1502202 | 2/1976 | (GB) . |
| 1535165 | 12/1978 | (GB) . |

* cited by examiner

*Primary Examiner*—Thomas R. Hannon
(74) *Attorney, Agent, or Firm*—Nixon & Vanderhye

(57) ABSTRACT

A tilting pad thrust bearing arrangement (30), comprises a circular array of pads ($35_1$, $35_2$, . . . ) having tilt pivots ($38_1$, $38_2$, . . . ) and supported spaced from a carrier surface (33) by supporting springs (40) in the form of a stack of at least two annular, axially deflectable spring members (41, 42). Each spring member (41 and 42) is spaced from an adjacent surface, the carrier surface (33) and spring member (41) respectively, by an array of deflection pivots ($41_1$, $41_2$, . . . , $42_1$, $42_2$, . . . ) disposed one pivot each between the tilt pivots of adjacent pads and acting as a fulcrum for spring deflection. The spring deflection pivots are in line axially so that upon axial loading of the bearing pads the spring (42) closest to the pads deflects at a first rate to contact the next spring (41) and the spring combination deflects at a second rate, at least until it contacts the carrier surface (33). Any number of springs may be stacked to give appropriate overall progressive deflection characterising.

9 Claims, 4 Drawing Sheets

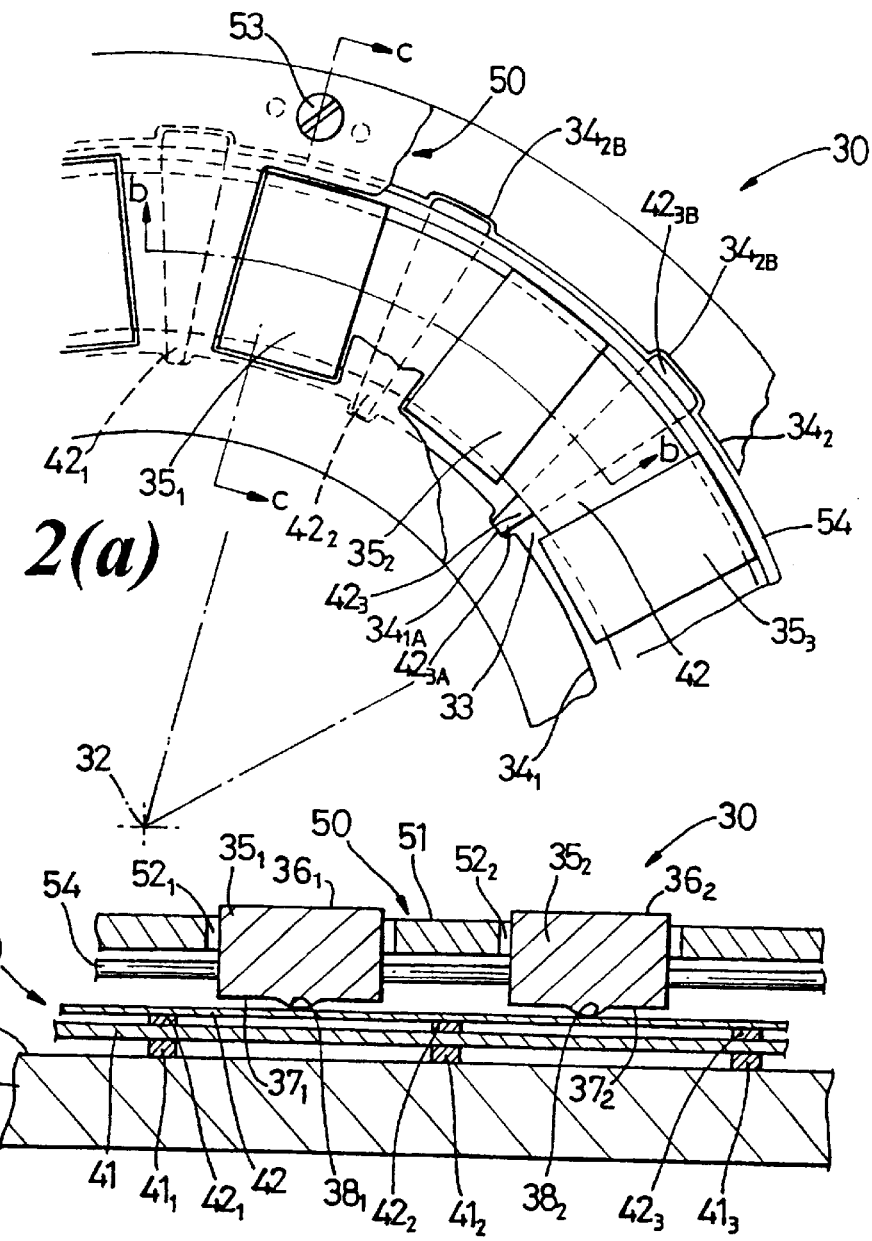
*Fig. 2(a)*
*Fig. 2(b)*
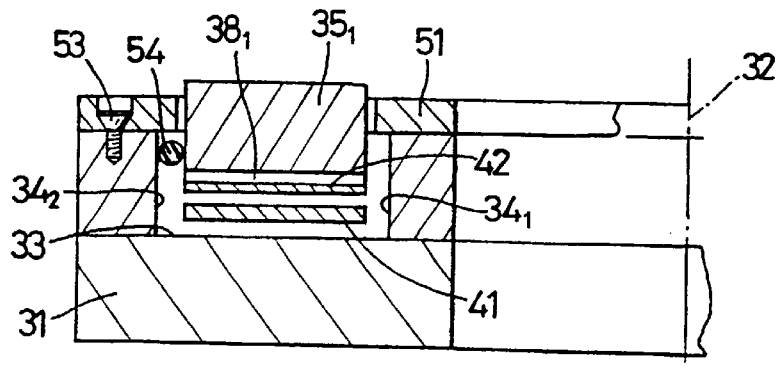
*Fig. 2(c)*

TILTING PAD THRUST BEARING ARRANGEMENT

This invention relates to tilting pad thrust bearing arrangements for apparatus having a shaft that is rotatable about an axis and particularly, but not exclusively, relates to such bearing arrangements in which the bearing pads are made from a hard, but brittle, ceramic material.

Tilting pad thrust bearings are known, for example, from GB-A-1535165, GB-A-1241098 and U.S. Pat. No. 3,937,534, the common constructional principle being that a plurality of bearing pads, disposed in a circular array about the shaft axis, each have an axially facing supporting face that is adapted to support (by way of an intervening fluid film), a radially extending part of the shaft and, opposite thereto, a supported face by which the pad itself is supported with respect to a carrier body on a pivot edge, hereinafter referred to as a 'tilt pivot', about which it can undertake a limited degree of tilting motion.

It will be appreciated that such thrust bearing pads are generally mounted loosely with respect to the carrier body in order to accommodate misalignments and tilting by the action of hydrodynamic films of the fluid when supporting the rotating shaft, said loose mounting being confined principally to retaining the pads within the arrangement when not in operation.

Various materials are known for the bearing pads, as are mounting methods which may be more or less suitable in dependence upon the nature of the pads. One particular pad form with which this invention is particularly concerned is that where each pad comprises a block of hard, but somewhat brittle, ceramic material, such as reaction bonded silicon carbide, for use with a low viscosity lubricant such as water.

Whereas pads made from such material are hard and able to function with relatively poor lubrication, the material is difficult to work (in terms of machining operations) and susceptible to damage by impacts and shock forces applied locally.

Figure 1A:
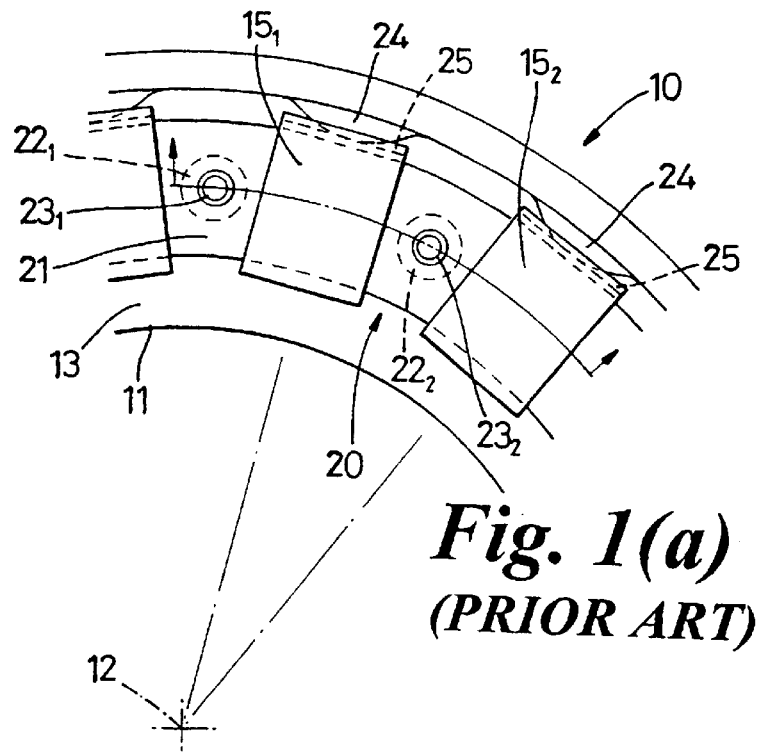
Figure 1B:
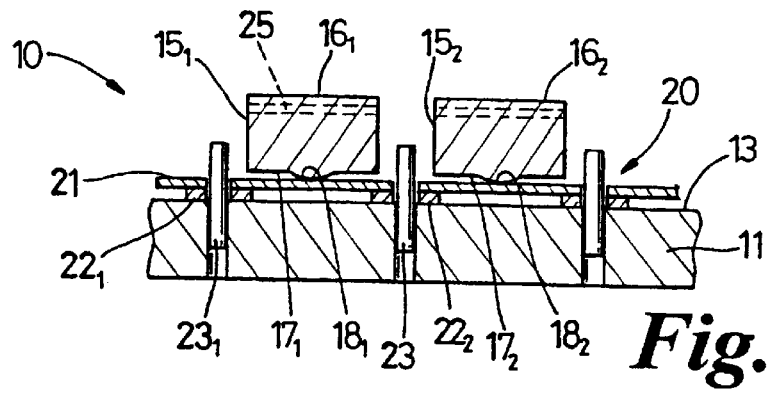

By way of example, FIGS. 1(a) and 1(b) show respectively somewhat schematic plan and sectional elevation views of a known form of tilting pad thrust bearing arrangement 10 in which the individual pads are made of a silicon carbide ceramic material. The bearing arrangement comprises an annular body carrier 11 extending circumferentially about axis 12, although only an arcuate part of the body is shown. The body has an axially facing carrier surface 13 on which is supported individual ceramic bearing pads $15_1$, $15_2$, . . . . Each bearing pad $15_i$ is a monolithic block of ceramic material formed with a substantially flat supporting face 16 and opposite thereto a supported face $17_i$ which is profiled to provide a radially extending tilt pivot ridge $18_i$. Each pad is supported on the face 13 of the carrier body by way of intervening supporting means 20, comprising an annular spring member 21 (of thin resilient steel) supported above the face 13 by spring deflection pivot pieces $22_1$, $22_2$, . . . formed by washers that are located on axially extending pins $23_1$, $23_2$, . . . . The pins and washers are disposed in a circumferential direction such that each pin and washer is disposed between the tilt pivot ridges of adjacent bearing pads.

The pins extend through the annular spring member and serve to locate the spring member and each pad against significant circumferential displacement whilst permitting relative freedom with regard to taking up a position determined by the borne load. To prevent the pads from falling from the carrier during and/or after assembly of the arrangement 10, a loosely fitting carrier projection or pin 24 co-operates with a groove 25 formed in at least one edge of the pad.

In operation, when the supporting face 16 of each pad is subjected to axially directed loads, the spring member 21 serves to absorb axial loading on the bearing pads by deflecting about the deflection pivot washers.

However, there are practical disadvantages to such structure. Firstly, the loose mounting which permits ready alignment under load also provides potential for the pads to impact on the pins, particularly in conditions of vibration, where damage may be caused to the pad material. Secondly, the groove 25 (or the like) required for retaining the pad in the arrangement requires at least one extra manufacturing step, which may not be trivial in ceramic materials, and assembly step. Thirdly, the simple spring has a substantially linear stiffness response (deflection vs. load characteristic) so that is must be carefully chosen in relation to anticipated axial loads to provide displacement of the pad but without 'bottoming' against the carrier body and leaving the pad vulnerable to shock loads. It will be appreciated that to minimise the chances of such 'bottoming' of the supporting means the spring member will have a stiffness or spring rate which is high and provided by a relatively thick component, and the deflection pivot washers $22_1$, . . . will be relatively thick, typically of the order of 2 mm and similar to the thickness of the spring member.

In particularly heavily loaded bearing arrangements the thickness required of the spring member may be such that it is vulnerable to cracking about the edge of a pivot washer and/or any stress points caused by the pins and/or their apertures, again leaving the pad open to experience shock loads. Furthermore, the provision of a spring stiffness higher than is required to support normally encountered loads, but deemed necessary for emergencies, may result in an unacceptable low damping characteristic.

Figure 1C:
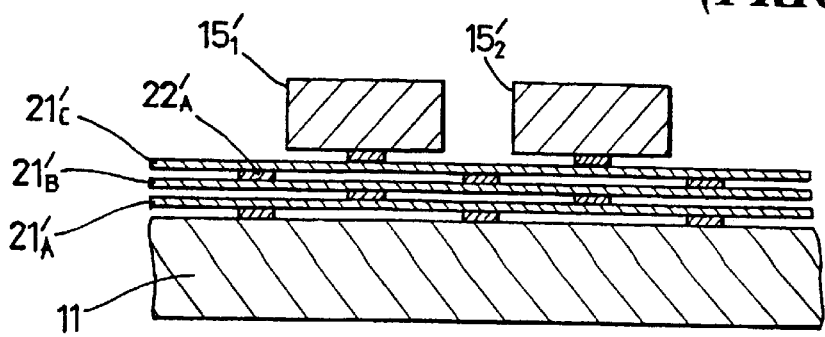

The problems of axial resilience and accommodating vibrational modes associated therewith has been addressed in the aforementioned U.S. Pat. No. 3,937,534, wherein the annular spring member supporting means takes the form of a stack of thinner, identical annular spring members each supported with respect to the next by an axially raised deflection pivot about which it can undergo deflection in response to axial loading, said deflection pivots of adjacent members being offset circumferentially with respect to each other so that the pivots of alternate members are axially in line. This is illustrated in simplified form in FIG. 1(c), which corresponds to the sectional elevation of FIG. 1 (b) described above and shows bearing pads $15'_1$, and $15'_2$ on spring members $21'_A$, $21'_B$ and $21'_C$ separated by pivot members $22'_A$ etc. Essentially, when an axial load is applied by way of the bearing pad, at a point between two deflection pivots, the load is transmitted by way of the pivots to the next spring member and so on, deflecting all of the annular spring members simultaneously and effectively providing a spring with a constant, low spring stiffness and low resonant frequency.

However, whilst such structure of supporting means is inherently less susceptible to damage to the spring members, it does not address the dichotomy of accommodating both acceptable/normal axial loads and exceptional loads of high magnitude, should they occur and be particularly damaging to the pads by virtue of pad materials.

Notwithstanding the particular problems of brittleness associated with ceramic materials or bearing pads, it may also be disadvantageous if the ability to absorb axial loads progressively and without risk of component failure is not available to more conventional, metal bearing pads.

In accordance with the present invention a tilting pad thrust bearing arrangement for apparatus having a shaft that is rotatable about an axis and comprising an annular body and an array of discrete bearing pads supported on the body by way of a tilt pivot and intervening annular pad supporting spring means, and in which the supporting spring means is in the form of a stack of at least two annular, axially deflectable spring members each being spaced from an adjacent annular surface by an associated circular array of deflection pivots disposed one pivot each between the tilt pivots of adjacent pads and acting as a fulcrum for spring deflection, is characterised by corresponding deflection pivots of the stacked annular spring members being substantially in alignment in an axial direction, the spring member closest to the bearing pads having a deflection characteristic, in response to axial loading between circumferentially adjacent deflection pivots by each bearing pad, in which a first predetermined level of axial load results in abutment with the adjacent spring member, and by said pair of abutting spring members having a deflection characteristic in which a second predetermined level of axial load, higher than said first, results in abutment with the next surface.

Preferably, the deflection pivots associated with each annular spring member may conveniently extend in a radial direction for at least the radial width of the spring member and may be formed by discrete spacers located by radially spaced, axially extending pins which extend through the axially aligned spacers or located by their end regions cooperably with notches or the like cut into radially facing side walls which bound the supporting means. Each bearing pad may also be supported by way of a tilt pivot comprising such a spacer disposed on the face of the spring member closest to the pad.

Such side walls may be capped by an apertured cage through which the bearing pads extend. The cage may be made of a material softer than the material of the bearing pads. The pads may be held with respect to the cage by means of a resilient extensible band stretched around the circular array of pads and overlying the underside of the cage.

Figure 3:
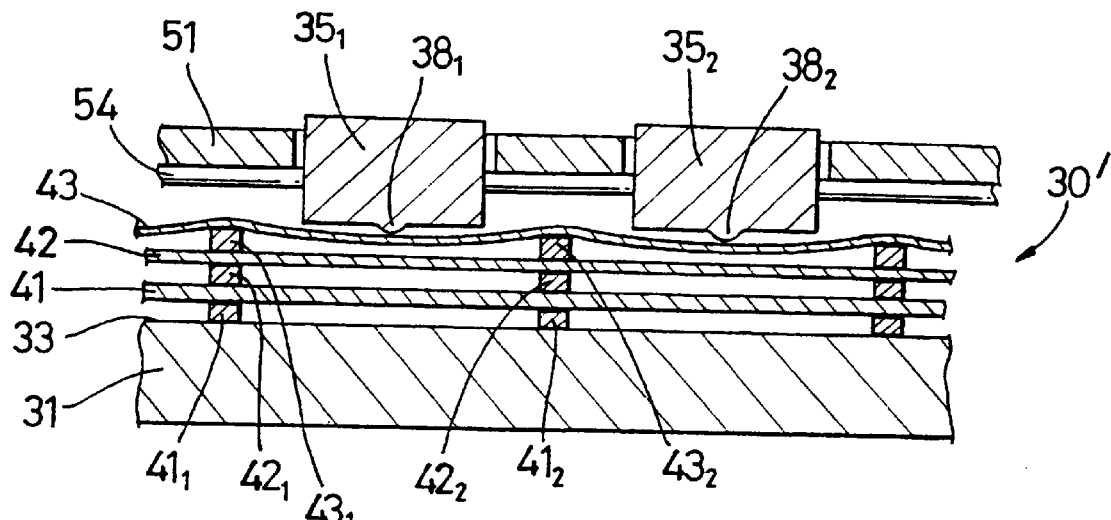
Figure 4:
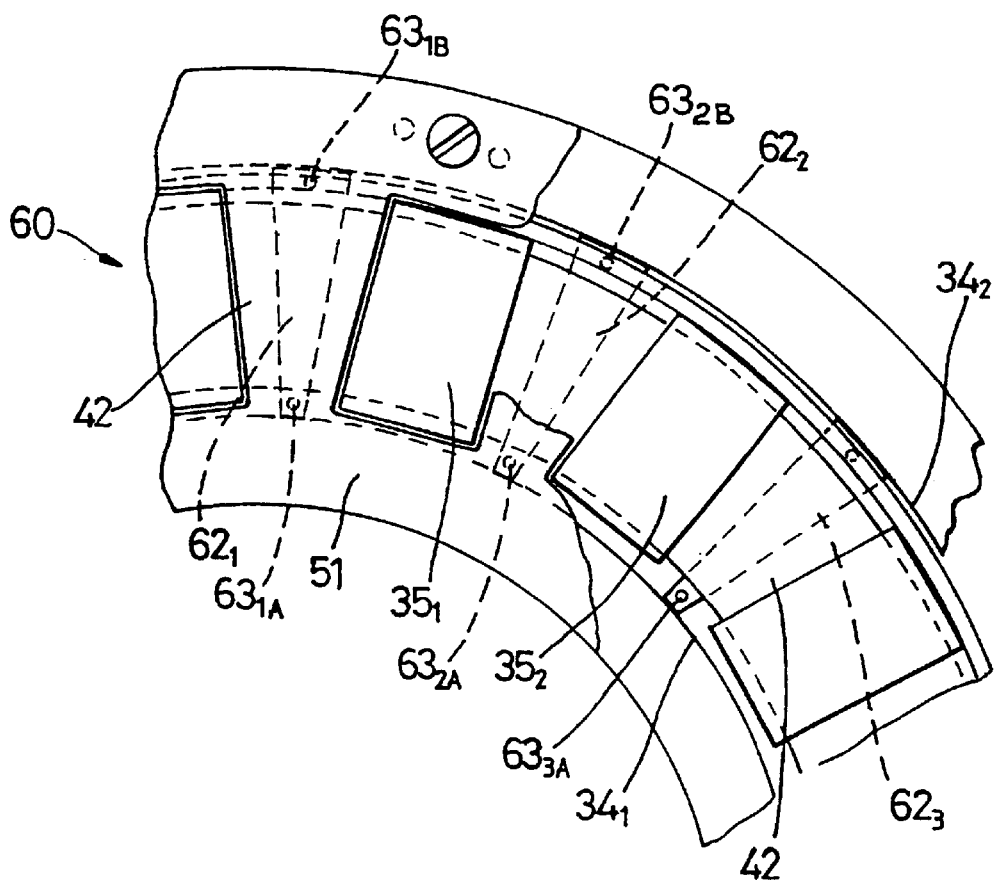
Figure 5A:
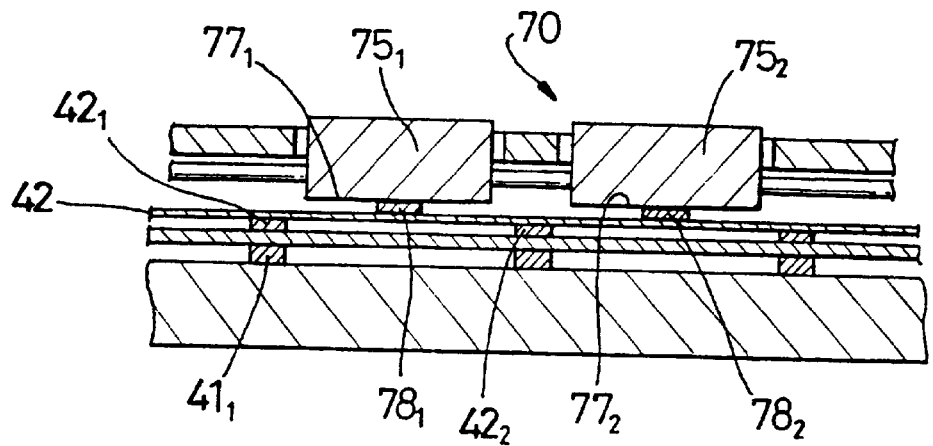
Figure 5B:
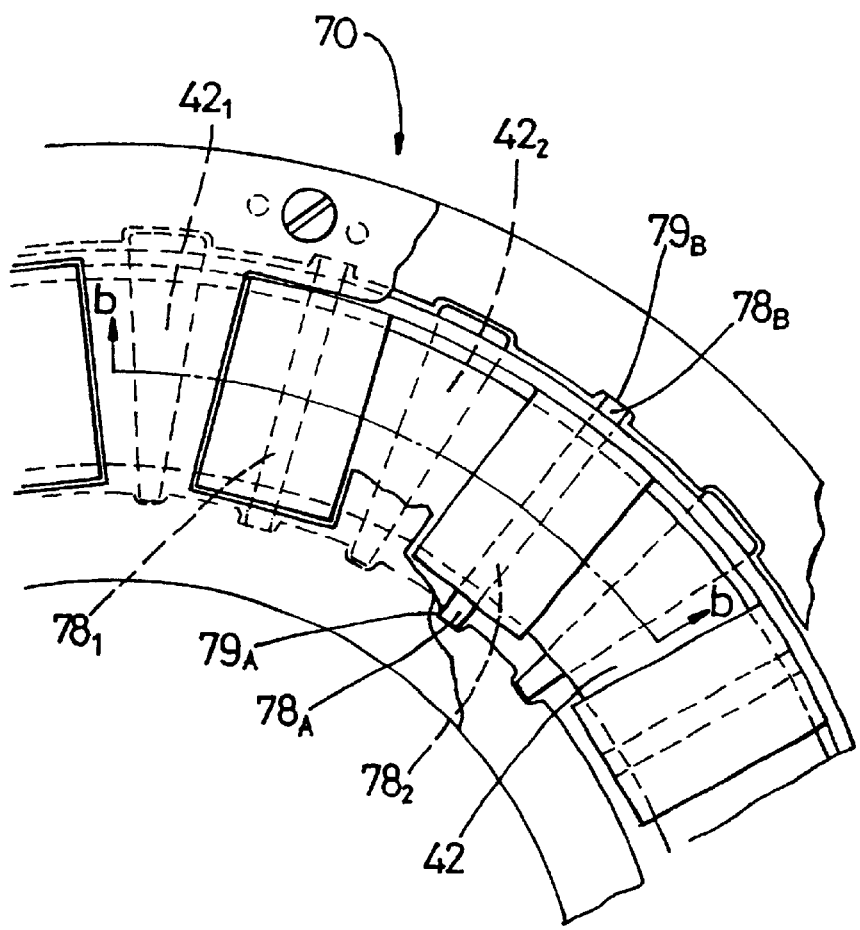

Embodiments of the invention will now be described by way of example with reference to the accompanying drawings, in which:

FIGS. 1(a)(b) and 1(c), as described hereinbefore, are respectively plan and sectional elevation views of known forms of tilting pad thrust bearing arrangement, FIG. 2(a) is a plan view of a part of a first embodiment of a tilting pad thrust bearing arrangement in accordance with the present invention, FIG. 2(b) is a sectional elevation on the line b—b of FIG. 2(a), FIG. 2(c) is a sectional elevation of the line c—c of FIG. 2(a), FIG. 3 is a sectional elevation, similar to that of FIG. 2(b) of a second embodiment of tilting pad thrust bearing arrangement, in which the supporting means comprises an additional, very low stiffness spring member disposed to bias the bearing pads axially in the absence of normal working loads, FIG. 4 is a plan view, similar to that of FIG. 2(a) of a third embodiment of tilting pad thrust bearing arrangement, in which the deflection pivot spacers are located by radially spaced, axially extending pins, and FIGS. 5(a) and 5(b) are plan and sectional elevation views, similar to FIGS. 2(a) and 2(b) of a fourth embodiment of tilting pad thrust bearing arrangement in which each pad is pivotable with respect to a tilt pivot ridge formed with the supporting means and separately of the pad.

Referring to FIGS. 2(a) to 2(c) the thrust bearing arrangement 30 comprises an annular carrier body 31 extending circumferentially about longitudinal through-axis 32. The body has an axially facing annular face 33, conveniently called the carrier surface, which is bounded radially inwardly and outwardly by axially extending, radially facing side walls $34_1$ and $34_2$.

Bearing pads $35_1$, $35_2$, ... are arranged uniformly about the axis 32 adjacent the body carrier face 33 but spaced therefrom by supporting means 40. Each pad, such as $35_i$ (where i=1,2,...) is formed from a block of silicon carbide material that has substantially flat surfaces, except that opposite load bearing face $36_i$ is a supported face $37_i$ that has a radially extending pivot ridge 38 formed thereon and facing the carrier surface 33.

A cage 50 is formed by an annular body 51 of material which is softer than the material of the bearing pads and is apertured at $52_1$, $52_2$, ... in correspondence with the spacing of the pads in the array to permit it to be passed around the pads and secured to the side walls $34_1$ and $34_2$ of the carrier body by screws 53 or the like, in order to provide both a restraint against excessive circumferential displacement of any pad and to limit ingress of contaminants whilst permittng free movement of the pads with regards to orientation relative to the carrier body. The bearing pads, being plain-sided blocks, are retained with respect to the carrier and cage in an axial direction by means of a resilient, extensible band 54, such as an O-ring of suitable elastomeric compound, stretched around the circular array of pads. The stretched band provides only weak bias force in a radially inward direction, but the frictional engagement between the stretched band and wall of each bearing pad effectively forms a adially outward extension, or 'lip', of each pad which overlies, and is able to abut, underside of the cage body 51 and provide axial restraint to prevent the pads from falling out when the bearing arrangement is handled removed from a surface to be borne by the pads.

The supporting means 40 comprises at least two annular spring members 41, 42, typically formed from steel, which are stacked in face to face relationship and separated from the carrier surface 33 and from each other by deflection pivots provided by axially thin spacers.

Each annular spring member 41, 42 has associated therewith a set of radially extending spacers $41_1$, $41_2$, ... and $42_1$, $42_2$, ..., each spacer being limited in circumferential extent, and disposed in a circular array substantially mid way between the tilt pivot ridges $38_i$ of adjacent bearing pads. Each set of spacers is disposed between the associated spring member and next spring member away from the bearing pad or carrier surface 33 as the case may be. The spacers are formed of substantially flat, parallel-faced shim material of some 0.05 to 0.1 mm thickness and the spring members deflect principally about a fulcrum formed by each edge of each spacer. The spacers may be of uniform circumferential width or, as shown, tapering or pie-shaped in plan view such that the in edges extend parallel to the tilt pivot ridges 38 of the adjacent bearing pads and the length of each spring member section between edges is substantially constant at all radial distances.

The spacers extend radially not only beyond the radial boundaries of the spring members but also the separation between side walls 34 and 34 such that their end regions $41_{1A}$, $41_{1B}$..., $42_{1A}$, $42_{1B}$... $42_{3A}$, $42_{3B}$, ... are located in co-operating notches $34_{1A}$ and $34_{2B}$ in the side walls.

The individual spacers of the sets associated with the spring members are disposed substantially in line axially such that at the circumferential positions of the spacers there is continuous support from the surface 33 of the carrier body for each of the spring members whereas between the spacer positions each bearing pad is supported solely by way of the sections of the spring member bridging the spacers.

The stiffness of the spring rate member 42 closest to the bearing pads, that is, its deflection characteristic in response to axial loading between circumferentially adjacent spacers, is chosen so that it is deflected as a function of the load, principally at its mid point, until at a first predetermined level of axial load, it comes into abutment with the mid point of the next spring member 41. The spring member 41 has a higher spring stiffness such that further deflection of both of the spring members requires a significantly greater axial load. If and when the spring member 41 is deflected by an axial load of a second predetermined level, higher than the first, it results in abutment with the carrier body surface, and no further resilience. Accordingly, the respective spring stiffnesses and spacer thicknesses are chosen with regard to anticipated ordinary and extraordinary axial loads such that this situation may be avoided. Therefore, the deflection characteristics of the spring member 42 may be chosen to accommodate axial loadings met in ordinary operation and that of the spring member to accommodate extraordinary levels of loading, in effect providing a soft-landing for the spring member 42.

It will be appreciated that the supporting means 40 may comprise three or more spring members of different stiffness each separated by axially aligned spacers so that the effective spring rate of the stack can be tailored in a suitable segmented and non-linear manner.

The general principle is shown in sectional elevation in FIG. 3 for three annular spring members. However, in a second embodiment 30' shown in that Figure, the spring member 43 adjacent the bearing pad has a particularly low stiffness, such that it is readily deflected, and in combination with associated spacers $43_1$, $43_2$. . . which are relatively thick such that the spring member 43 lifts and gently biases the bearing pads into position against a surface which it is intended to support or, absent such surface, against the cage 50, thereby helping to eliminate any looseness or play in the absence a significant bearing loading which could cause noise or vibration phenomena or impact damage to the bearing pads. Such a biasing spring is readily deflected when the bearing is under operational load such that it bears against the next spring member 42 which offers the first significant resistance to axial loading.

It will be appreciated that the components of the supporting means 40, and indeed the bearing arrangement 30 as a whole, may be varied to facilitate differences in manufacturing practice.

Referring to FIG. 4, this shows in plan view a third embodiment of tilting pad thrust bearing arrangement 60. The integers common to the arrangement 30 are given the same reference numbers. The spring members (only one of which, 42, is visible) have associated therewith radially extending deflection pivots formed by shim-thick spacers $62_1$, $62_2$. . . , located by way of axially extending pins $63_{1A}$, $63_{1B}$, $63_{2A}$, $63_{2B}$. . . passing through apertures in the spacers but spaced radially so as to confine the annular spring members radially without passing through them by way of through-apertures which could provide points of weakness.

Referring to FIGS. 5(a) and 5(b) which show plan and sectional elevations respectively of a fourth embodiment of tilting pad thrust bearing arrangement 70, corresponding substantially to the views of FIGS. 2(a) and 2(b) common integers are given common reference members. In this arrangement 70 the bearing pads $75_1$, $75_2$ are each formed with the supported faces $77_1$, $77_2$, . . . substantially flat and the tilt pivot ridge is formed by way of a discrete shim member $78_1$, $78_2$, . . . analogous to the spacers $41_1$, $41_2$, . . . which extends radially across the upper spring member 42 between end regions $78_A$ and $78_B$ engaging in locating notches $79_A$ and $79_B$ in the side walls analogous to notches $34_{1A}$ and $34_{2B}$.

It will also be appreciated other variations in construction are possible and may be understood without specific illustration. For example, a non-integral tilt pivot ridge associated with each bearing pad and/or the deflection pivot spacers associated with each annular spring member may be formed secured to the spring member or by an embossment or pleat of the spring member which provides a local change in effective axial extent, even if for practical purposes the pivot ridges are not precisely aligned axially.

Although in the various embodiments described above the pivot ridge about which each pad tilts has been shown centrally disposed with respect to each bearing pad in a circumferential, that is, rotational, direction, it is possible, as is well known in the art, to dispose the pivot ridge off-centre to give directional characteristics to the bearing arrangement. This is readily accommodated in the above described embodiments by positioning the cage body 51 rotationally with respect to the carrier body side walls such that the apertures $52_1$, $52_2$, . . . locate each pad with its integral pivot ridge (38) centrally disposed between adjacent pivot spacers or a prescribed part of its supported face (77) positioned adjacent a discrete pivot ridge (78) that is already centrally disposed between adjacent deflection pivot spacers.

It will be appreciated that the increased stiffness of each annular springs member with increasing distance from the bearing pads may be controlled other than by way of spring member thickness and/or material. The deflection length of the spring member may be reduced by association with a circumferentially more extensive spacers or by substituting for at each spacer position an array of two or more closely spaced, circumferentially short spacers.

It will be appreciated that the concept of having a stack of spring members with different stiffnesses may be applied in combination with having the deflection pivot ridges associated with some of the spring members not aligned axially in the manner of the aforementioned U.S. Pat. No. 3,937,534, for obtaining a softer spring characteristic for part of its operational deflection.

Whereas the above described embodiments and variations are particularly suited to tilting pad thrust bearing arrangements in which the bearing pads are formed of a brittle ceramic material, it will be seen to offer advantage in terms of simplicity of construction and ability to vary axial spring characteristics that are generally applicable Independently of bearing pad material.

What is claimed is:

1. A tilting pad thrust bearing arrangement for apparatus having a shaft that is rotatable about an axis, the arrangement comprising an annular body and an array of discrete bearing pads, supported on the body by way of a tilt pivot and intervening annular pad supporting spring means, the supporting spring means being in the form of a stack of at least two annular, axially deflectable spring members each being spaced from an adjacent annular surface by an associated circular array of deflection pivots disposed one pivot each between the tilt pivots of adjacent pads and acting as a fulcrum for spring deflection, wherein corresponding deflection pivots of the stacked annular spring members are substantially in alignment in an axial direction, the spring member closest to the bearing pads has a deflection characteristic, in response to axial loading between circumferentially adjacent deflection pivots by each bearing pad, in which a first predetermined level of axial load results in abutment with the adjacent spring member, and said pair of abutting spring members have a deflection characteristic in which a second predetermined level of axial load, higher than said first, results in abutment with the next surface.

2. An arrangement as claimed in claim 1 wherein the deflection pivots associated with each annular spring member extend in a radial direction for at least the radial width of the spring member.

3. An arrangement as claimed in claim 1 wherein the deflection pivots are formed by discrete spacers located by radially spaced, axially extending pins which extend through the axially aligned spacers.

4. An arrangement as claimed in claim 1 wherein the supporting means is bounded by radially facing side walls and the deflection pivots are formed by discrete spacers located by their end regions cooperably with notches cut into the radially facing side walls.

5. An arrangement as claimed in claim 1 wherein each bearing pad is also supported by way of a tilt pivot comprising a spacer disposed on the face of the spring member closest to the pad.

6. An arrangement as claimed in claim 1 wherein the supporting means is bounded by radially facing side walls capped by an apertured cage through which the bearing pads extend.

7. An arrangement as claimed in claim 6 wherein the cage comprises a material softer than the material of the bearing pads.

8. An arrangement as claimed in claim 6 wherein the spring member closest to the bearing pads is arranged with respect to the deflection pivots therefor to bias said bearing pads towards the cage.

9. An arrangement as claimed in claim 1 wherein the pads are held with respect to the cage by means of a resilient extensible band stretched around the circular array of pads and overlying the underside of the cage.

* * * * *